(12) United States Patent
Zhu

(10) Patent No.: US 10,288,793 B2
(45) Date of Patent: May 14, 2019

(54) BACKLIGHT MODULE, METHOD OF MANUFACTURING THE SAME AND DISPLAY DEVICE

(71) Applicant: BOE TECHNOLOGY GROUP CO., LTD., Beijing (CN)

(72) Inventor: Ming Zhu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 316 days.

(21) Appl. No.: 15/209,141

(22) Filed: Jul. 13, 2016

(65) Prior Publication Data

US 2017/0115440 A1 Apr. 27, 2017

(30) Foreign Application Priority Data

Oct. 27, 2015 (CN) .......................... 2015 1 0708762

(51) Int. Cl.
*F21V 7/04* (2006.01)
*F21V 8/00* (2006.01)
(52) U.S. Cl.
CPC ........... *G02B 6/005* (2013.01); *G02B 6/0043* (2013.01)
(58) Field of Classification Search
CPC .... G02B 6/005; G02B 6/0051; G02B 6/0053; G02B 6/0055; G02B 6/0065
See application file for complete search history.

(56) References Cited

U.S. PATENT DOCUMENTS

| 7,376,327 B2 | 5/2008 | Galstian et al. |
| 2012/0113672 A1* | 5/2012 | Dubrow ................. B82Y 20/00 362/602 |

FOREIGN PATENT DOCUMENTS

| CN | 103032765 A | 4/2013 |
| CN | 103486498 A | 1/2014 |
| CN | 104075190 A | 10/2014 |
| CN | 104503137 A | 4/2015 |
| CN | 104914622 A | 9/2015 |

OTHER PUBLICATIONS

First Office Action regarding Chinese application No. 201510708762. 1, dated Dec. 2, 2016. Translation provided by Dragon Intellectual Property Law Firm.

* cited by examiner

*Primary Examiner* — Ali Alavi
(74) *Attorney, Agent, or Firm* — Harness, Dickey & Pierce, P.L.C.

(57) ABSTRACT

The present disclosure discloses a backlight module, a method of manufacturing the same and a display device. The backlight module includes a light guide plate and a quantum dot film attached to the light guide plate in a full lamination manner. Quantum dot materials are arranged in the quantum dot film to function as screen dots of the light guide plate, and have different distribution densities in different areas of the quantum dot film.

18 Claims, 3 Drawing Sheets

BACKLIGHT MODULE, METHOD OF MANUFACTURING THE SAME AND DISPLAY DEVICE

CROSS-REFERENCE TO RELATED APPLICATION

This application claims a priority of the Chinese Patent Application No. 201510708762.1 on Oct. 27, 2015, the disclosure of which is incorporated in its entirety by reference herein.

TECHNICAL FIELD

The present disclosure relates to the field of the display technology, in particular to a backlight module, a display device and a method of manufacturing the backlight module.

BACKGROUND

For a quantum dot film used by a backlight module, red and green quantum dots on the quantum dot film may be excited by a blue LED lamp so as to emit light. For a display substrate of a small size, its light guide plate is provided with screen dots having specific structures, which change a light propagation direction to prevent a total reflection within the light guide plate so as to enable the light guide plate to have a good light guide effect. For a display substrate of a medium size or a large size, its light guide plate is provided with ink screen dots, and a scattering function of the ink is used to prevent the total reflection within the light guide plate so as to enable the light guide plate to have a good light guide effect. However, for both the above two manners, it is required to manufacture the screen dots in the light guide plate. Therefore, the process is complex and the cost is high.

SUMMARY

The technical problem to be solved by the present disclosure is how to simplify a manufacturing process of the screen dots on the light guide plate. For solving the above problem, the present disclosure provides a backlight module, which includes a light guide plate; and a quantum dot film, which is attached to the light guide plate in a full lamination manner, wherein quantum dot materials are arranged in the quantum dot film, function as screen dots of the light guide plate, and have different distribution densities in different areas of the quantum dot film.

Alternatively, the quantum dot materials include a red quantum dot material and/or a green quantum dot material.

Alternatively, the backlight module further includes a light source, which is arranged at a side of the light guide plate, wherein the densities of the quantum dot materials in the quantum dot film are in direct proportion to distances between the quantum dot materials and the light source.

Alternatively, the backlight module further includes a reflecting layer, which is arranged under the light guide plate; a first prism layer, which is arranged on the light guide plate in such a manner as to refract light in a first direction; a second prism layer, which is arranged on the first prism layer in such a manner as to refract light in a second direction perpendicular to the first direction; and a scattering film, which is arranged on the second prism layer.

Alternatively, the quantum dot materials are arranged in the quantum dot film in accordance with a preset screen dot pattern.

Alternatively, the quantum dot film is attached to the light guide plate via a joint adhesive.

Alternatively, the joint adhesive is a double-sided joint adhesive without a base material.

Alternatively, the double-sided joint adhesive is an optical adhesive.

The present disclosure further provides a display device, which includes any of the above backlight modules.

The present disclosure further provides a method of manufacturing the backlight module, which includes the steps of: mixing a red quantum dot material with a green quantum dot material in accordance with a preset proportion; manufacturing ink for inkjet printing with the mixed material; printing the ink to a thin film in an inkjet printing manner to form a quantum dot film; and attaching the quantum dot film to the light guide plate in a direct boding manner, with the red quantum dot material and the green quantum dot material being taken as screen dots of the light guide plate.

The present disclosure further provides a method of manufacturing the backlight module, which includes the steps of: mixing a red quantum dot material with a green quantum dot material in accordance with a preset proportion; manufacturing glue for screen printing with the mixed material; printing the glue to a thin film in a screen printing manner to form a quantum dot film; and attaching the quantum dot film to the light guide plate in a full lamination manner, with the red quantum dot material and the green quantum dot material being taken as screen dots of the light guide plate.

Through the above technical solution, since quantum dot materials are provided in the quantum dot film, they can directly function as the screen dots on the light guide plate after the quantum dot film is attached to the light guide plate in a full lamination manner so that the screen dots need not be arranged independently, which simplifies the manufacturing process, and at the same time, the reliability of the quantum dots on the light guide plate is improved.

BRIEF DESCRIPTION OF THE DRAWINGS

The features and the advantages of the present disclosure will be understood in a clear manner with reference to the figures. However, the figures are for illustrative purposes only, but cannot be understood as a limitation on the present disclosure. In the figures.

DETAILED DESCRIPTION

The present disclosure will be described in detail in conjunction with the drawings and embodiments so that the object, the features and the advantages of the present disclosure will be understood in a clear manner. It should be noted that, in the case of absence of conflicts, the embodiments and the features in the embodiments can be mutually combined.

Specific details will be given in the following descriptions to facilitate the understanding of the present disclosure. However, the present disclosure can be implemented with other manners that are different from the following manners. Therefore, the scope of the present disclosure is not limited to the following embodiments.

Figure 1:
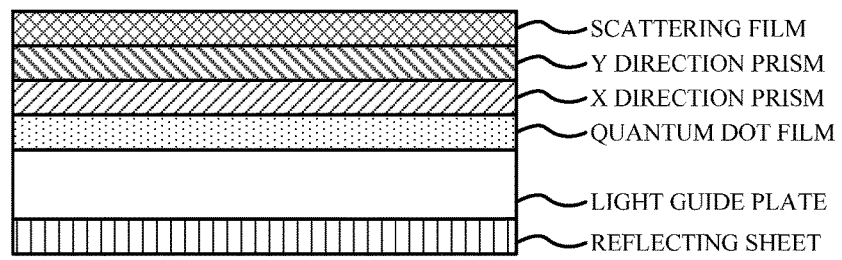
FIG. 1 is a schematic view showing a backlight module.

For the quantum dot film used by the backlight module, red and green quantum dots on the quantum dot film may be excited by a blue LED lamp so as to emit light. FIG. 1 shows a backlight module, which includes a reflecting sheet, a light guide plate, a quantum dot film, X direction prism, Y direction prism and a scattering film in sequence. For a display substrate of a small size, its light guide plate is provided therein with screen dots having specific structures, which can change a light propagation direction to prevent a total reflection within the light guide plate so as to enable the light guide plate to have a good light guide effect. For a display substrate of a medium size or a large size, its light guide plate is provided therein with ink screen dots, and a scattering function of the ink is used to prevent the total reflection within the light guide plate so as to enable the light guide plate to have a good light guide effect. However, for both the above two manners, it is required to manufacture the screen dots in the light guide plate. Therefore, the process is complex and the cost is high.

Figure 2:
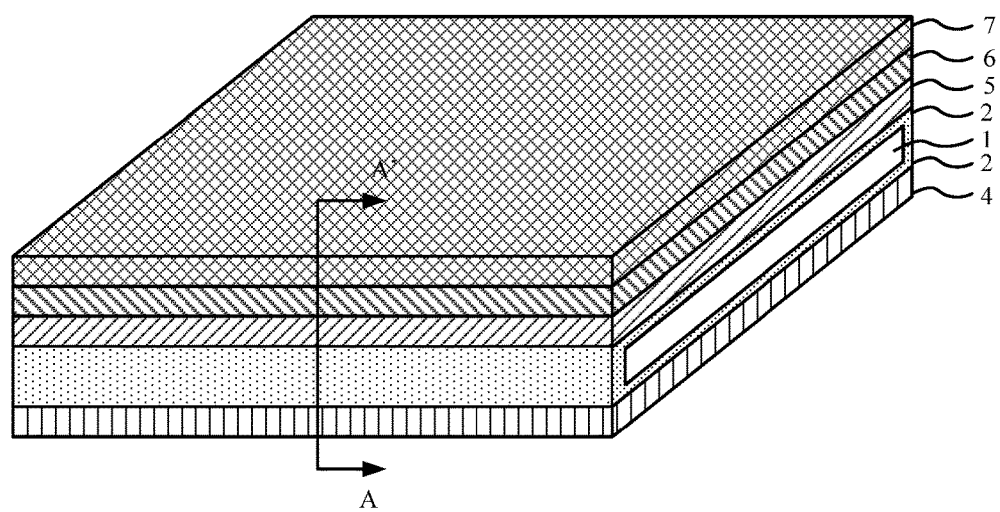
FIG. 2 is a schematic view showing a backlight module according to some embodiments of the present disclosure.
Figure 3:
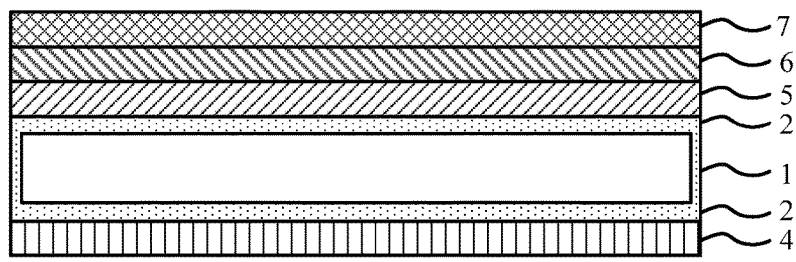
FIG. 3 is a sectional view of the backlight module along line A-A' in FIG. 2.

For solving the above problem, as shown in FIGS. 2 and 3, the present disclosure provides in some embodiments a backlight module, which includes a light guide plate 1; and a quantum dot film 2, which is attached to the light guide plate in a full lamination manner. Quantum dot materials are arranged in the quantum dot film 2, function as screen dots of the light guide plate 1, and have different distribution densities in different areas of the quantum dot film 2.

The quantum dot materials are provided in the quantum dot film 2, and thus, after the quantum dot film 2 is attached to the light guide plate 1 in a full lamination manner, the quantum dot materials in the quantum dot film 2 directly may function as screen dots on the light guide plate 1 so that the screen dots need not to be arranged independently, which simplifies the manufacturing process. In addition, by means of the full lamination manner (which is also called a direct bonding manner, an optical bonding manner or a non-air gap manner), the quantum dot film 2 is closely attached to the light guide plate 1, and thus, there is no gap between contact surfaces of the quantum dot film 2 and the light guide plate 1 so as to ensure that the quantum dot materials can function as the screen dots of the light guide plate 1 effectively, thereby improving the reliability of the quantum dots on the light guide plate. Here, the full lamination technique refers to that two layers of materials are attached to each other in a tight manner by using glue or optical glue.

When the quantum dot materials are irradiated by the light in the light guide plate 1, the quantum dot materials are excited to emit light, which improves the whole brightness of the backlight module. Meanwhile the quantum dot materials, as the screen dots, may change the propagation direction of the light so as to prevent the the total reflection from occurring in the light guide plate 1, thereby realizing a good light guide effect. When an edge type light source is employed along with the light guide plate 1, the farther a position on the light guide plate 1 from the light source, the smaller an intensity of the light received at the position. Therefore, quantum dot materials can be disposed to have different distribution densities in different areas of the quantum dot film 2 so that the quantum dot materials that function as the screen dots of the light guide plate 1 may have different distribution densities in different areas of the light guide plate, so as to adjust the light intensities at different positions of the light guide plate.

Alternatively, the quantum dot materials include a red quantum dot material and/or a green quantum dot material.

Excitation energies required for the red quantum dot material and the green quantum dot material are relatively low, so they can be easily excited to emit light through other light sources such as a blue light source.

Figure 4:
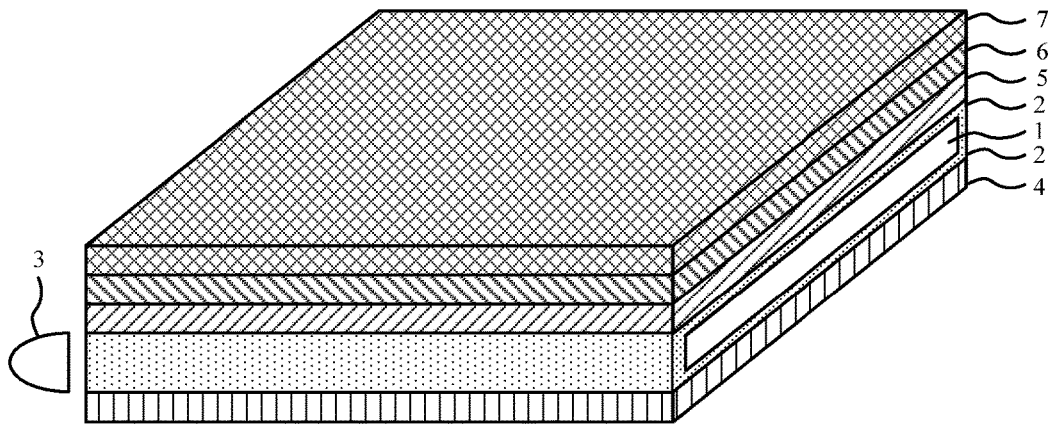
FIG. 4 is another schematic view showing the backlight module according to some embodiments of the present disclosure.

As shown in FIG. 4, alternatively, the backlight module further includes a light source 3, which is arranged at a side of the light guide plate 1. The densities of the quantum dot materials in the quantum dot film 2 are in a direct proportion to distances between the quantum dot materials and the light source 3.

The farther a position in the light guide plate 1 is from the light source 3, the sparser the light will be. Therefore, more dense quantum dot materials may be provided in the quantum dot film 2 at a position that is relatively far from the light source 3, so that the light within the light guide plate 1 can excite more quantum dot materials to emit light, thereby ensuring that the brightness of the light at a position that is relatively far from the light source 3 in the light guide plate 1 is not obviously weakened.

Alternatively, the backlight module further includes a reflecting layer 4, which is arranged under the light guide plate 1; a first prism layer 5, which is arranged on the light guide plate 1 in such a manner as to refract light in a first direction; a second prism layer 6, which is arranged on the first prism layer 5 in such a manner as to refract light in a second direction perpendicular to the first direction; and a scattering film 7, which is arranged on the second prism layer 6.

Alternatively, the quantum dot materials are arranged in the quantum dot film 2 in accordance with a preset screen dot pattern. The quantum dot materials can function as the screen dots at a surface of the light guide plate 1, and the screen dot pattern can be set in accordance with actual requirements.

Alternatively, the quantum dot film 2 is attached to the light guide plate 1 via a joint adhesive.

Alternatively, the joint adhesive is a double-sided joint adhesive without a base material.

The double-sided joint adhesive without a base material in the embodiments may be optically clear adhesive (OCA). The OCA optical adhesive is colorless, has a light transmittance of higher than 90%, a good cementing strength and a small curing shrinkage, and can be cured at a room temperature or medium temperature. With the above advantages, the quantum dot film can be attached to the light guide plate by means of the OCA optical adhesive. The OCA optical adhesive can be manufactured by using an optical acrylic adhesive as a base and attaching a release film layer at each of an upper surface and a lower surface of the optical acrylic adhesive.

The present disclosure further provides a display device, which includes any of the above backlight modules.

It should be noted that, the display device in this embodiment can be any product or component having a display function such as electronic paper, a mobile phone, a tablet computer, a television, a laptop, a digital photo frame and a navigator.

Figure 5:
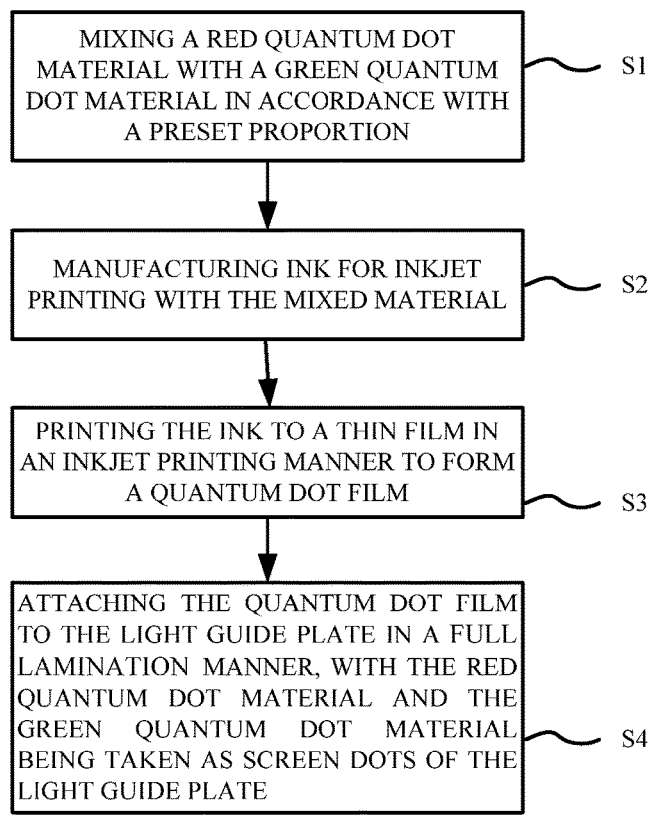
FIG. 5 is a flow chart showing a method of manufacturing a backlight module according to some embodiments of the present disclosure.

As shown in FIG. 5, the present disclosure further provides a method of manufacturing the above backlight module, which includes the following steps: Step S1: mixing a red quantum dot material with a green quantum dot material in accordance with a preset proportion; Step S2: manufacturing ink for inject printing with the mixed material; Step S3: printing the ink to a thin film in an inkjet printing manner to form a quantum dot film; and Step S4: attaching the quantum dot film to the light guide plate in a full lamination manner, with the red quantum dot material and the green quantum dot material being taken as screen dots of the light guide plate.

Figure 6:
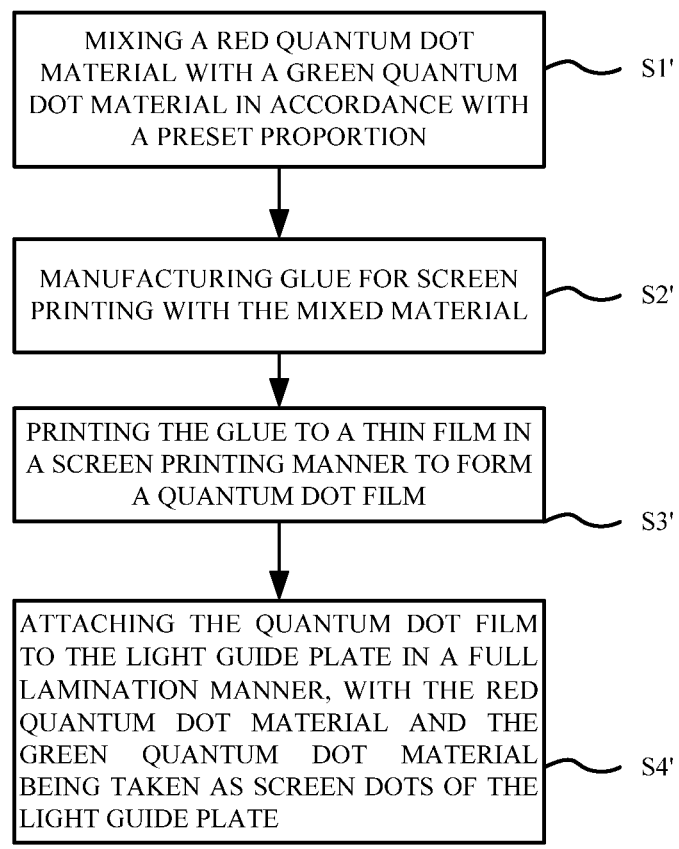
FIG. 6 is another flow chart showing the method of manufacturing the backlight module according to some embodiments of the present disclosure.

As shown in FIG. 6, the present disclosure further provides a method of manufacturing the above backlight module, which includes the following steps: Step S1': mixing a red quantum dot material with a green quantum dot material in accordance with a preset proportion; Step S2': manufacturing glue for screen printing with the mixed material; Step S3': printing the glue to a thin film in a screen printing manner to form a quantum dot film; and Step S4': attaching the quantum dot film to the light guide plate in a full lamination manner, with the red quantum dot material and the green quantum dot material being taken as screen dots of the light guide plate.

The technical solution of the present disclosure is described in detail in conjunction with the above drawings. In the present disclosure, the quantum dot materials are provided in the quantum dot film 2, and after the quantum dot film is attached to the light guide plate 1 in a full lamination manner, the quantum dot materials may directly function as the screen dots on the light guide plate. Therefore, compared with the complex process of manufacturing the screen dots on the light guide plate in the related art, there is no need to arrange the screen dots independently, so it is able to simplify the manufacturing process.

It also should be noted that, in the figures, the sizes of the layers and the regions may be exaggerated for clear illustrations. It should be noted that, when it is mentioned that a component or a layer is "on" another component or layer, it can be directly arranged on the other component, or one or more intermediate layers may be arranged therebetween. In addition, it should be understood that, when it is mentioned that a component or a layer is "under" another component or layer, it can be directly arranged under the other component, or one or more intermediate layers or components may be arranged therebetween. Besides, it can be understood that, when it is mentioned that a layer or a component is arranged "between" two layers or two components, it may be the only layer between the two layers or the two components, or one or more intermediate layers or components may be arranged therebetween. Similar reference signs indicate similar components throughout the whole disclosure.

In the present disclosure, terms "first" and "second" are for illustrative purposes only, but cannot be understood as indicating or suggesting relative importance.

The above are merely the preferred embodiments of the present disclosure, and the present disclosure is not limited thereto. A person skilled in the art may make further modifications and variations. The variations, equivalent substitutions and improvements within the sprit and the principle of the present disclosure shall also be included in the scope of the present disclosure.

What is claimed is:

1. A backlight module, comprising:
   a light guide plate; and
   a quantum dot film, which is attached to the light guide plate in a full lamination manner,
   wherein quantum dot materials are arranged in the quantum dot film, function as screen dots of the light guide plate, and have different distribution densities in different areas of the quantum dot film; and the light guide plate is arranged in the quantum dot film.

2. The backlight module according to claim 1, wherein the quantum dot materials comprise a red quantum dot material, or a green quantum dot material, or both the red quantum dot material and the green quantum dot material.

3. The backlight module according to claim 1, further comprising:
   a light source, which is arranged at a side of the light guide plate,
   wherein the densities of the quantum dot materials in the quantum dot film are in direct proportion to distances between the quantum dot materials and the light source.

4. The backlight module according to claim 1, further comprising:
   a reflecting layer, which is arranged under the light guide plate;
   a first prism layer, which is arranged on the light guide plate in such a manner as to refract light in a first direction;
   a second prism layer, which is arranged on the first prism layer in such a manner as to refract light in a second direction perpendicular to the first direction; and
   a scattering film, which is arranged on the second prism layer.

5. The backlight module according to claim 1, wherein the quantum dot materials are arranged in the quantum dot film in accordance with a preset screen dot pattern.

6. The backlight module according to claim 1, wherein the quantum dot film is attached to the light guide plate via a joint adhesive.

7. The backlight module according to claim 6, wherein the joint adhesive is a double-sided joint adhesive without a base material.

8. The backlight module according to claim 7, wherein the double-sided joint adhesive is an optical adhesive.

9. A display device, comprising the backlight module according to claim 1.

10. The display device according to claim 9, wherein quantum dot materials comprise a red quantum dot material, or a green quantum dot material, or both the red quantum dot material and the green quantum dot material.

11. The display device according to claim 9, wherein the backlight module further comprises:
    a light source, which is arranged at a side of a light guide plate,
    wherein densities of quantum dot materials in a quantum dot film are in direct proportion to distances between the quantum dot materials and the light source.

12. The display device according to claim 9, wherein the backlight module further comprises:
    a reflecting layer, which is arranged under a light guide plate;
    a first prism layer, which is arranged on the light guide plate in such a manner as to refract light in a first direction;
    a second prism layer, which is arranged on the first prism layer in such a manner as to refract light in a second direction perpendicular to the first direction; and
    a scattering film, which is arranged on the second prism layer.

13. The display device according to claim 9, wherein quantum dot materials are arranged in a quantum dot film in accordance with a preset screen dot pattern.

14. The display device according to claim 9, wherein a quantum dot film is attached to a light guide plate via a joint adhesive.

15. The display device according to claim 14, wherein the joint adhesive is a double-sided joint adhesive without a base material.

16. The display device according to claim 15, wherein the double-sided joint adhesive is an optical adhesive.

17. A method of manufacturing the backlight module according to claim 1, comprising the steps of:
   mixing a red quantum dot material with a green quantum dot material in accordance with a preset proportion;
   manufacturing ink for inkjet printing with the mixed material;
   printing the ink to a thin film in an inkjet printing manner to form a quantum dot film; and
   attaching the quantum dot film to the light guide plate in a full lamination manner, with the red quantum dot material and the green quantum dot material being taken as screen dots of the light guide plate.

18. A method of manufacturing the backlight module according to claim 1, comprising the steps of:
   mixing a red quantum dot material with a green quantum dot material in accordance with a preset proportion;
   manufacturing glue for screen printing with the mixed material;
   printing the glue to a thin film in a screen printing manner to form a quantum dot film; and
   attaching the quantum dot film to the light guide plate in a full lamination manner, with the red quantum dot material and the green quantum dot material being taken as screen dots of the light guide plate.

* * * * *